US008051442B2

(12) United States Patent
Ergen et al.

(10) Patent No.: US 8,051,442 B2
(45) Date of Patent: Nov. 1, 2011

(54) METHODS AND APPARATUS FOR PRESENTING ADVERTISEMENTS BASED ON A LOCATION OF A PRESENTATION DEVICE

(75) Inventors: Charles W. Ergen, Littleton, CO (US); Danny J. Minnick, Littleton, CO (US)

(73) Assignee: DISH Network L.L.C., Englewood, CO (US)

(*) Notice: Subject to any disclaimer, the term of this patent is extended or adjusted under 35 U.S.C. 154(b) by 619 days.

(21) Appl. No.: 12/024,545

(22) Filed: Feb. 1, 2008

(65) Prior Publication Data

US 2009/0172724 A1    Jul. 2, 2009

Related U.S. Application Data

(60) Provisional application No. 61/017,866, filed on Dec. 31, 2007.

(51) Int. Cl.
*H04N 7/025* (2006.01)
(52) U.S. Cl. .......... 725/32; 725/34; 725/35; 725/36
(58) Field of Classification Search .......... 725/32–36
See application file for complete search history.

(56) References Cited

U.S. PATENT DOCUMENTS

| | | | |
|---|---|---|---|
| 7,266,832 B2 | 9/2007 | Miller | |
| 2002/0059590 A1* | 5/2002 | Kitsukawa et al. | 725/36 |
| 2002/0092017 A1 | 7/2002 | Klosterman et al. | |
| 2002/0144262 A1* | 10/2002 | Plotnick et al. | 725/32 |
| 2002/0194595 A1* | 12/2002 | Miller et al. | 725/36 |
| 2004/0003402 A1* | 1/2004 | McKenna, Jr. | 725/46 |
| 2004/0015998 A1* | 1/2004 | Bokor et al. | 725/136 |
| 2004/0078814 A1* | 4/2004 | Allen | 725/47 |
| 2004/0139475 A1* | 7/2004 | Zenoni | 725/113 |
| 2006/0015893 A1* | 1/2006 | Kitsukawa et al. | 725/23 |
| 2006/0174312 A1 | 8/2006 | Ducheneaut et al. | |
| 2006/0195866 A1* | 8/2006 | Thukral | 725/34 |
| 2006/0200842 A1 | 9/2006 | Chapman et al. | |
| 2007/0033613 A1 | 2/2007 | Ward, III et al. | |
| 2007/0061838 A1* | 3/2007 | Grubbs et al. | 725/35 |
| 2007/0094692 A1 | 4/2007 | de Heer | |
| 2007/0107011 A1* | 5/2007 | Li et al. | 725/34 |
| 2007/0214470 A1* | 9/2007 | Glasgow et al. | 725/10 |
| 2007/0240058 A1 | 10/2007 | Chen | |
| 2007/0266400 A1* | 11/2007 | Rogers et al. | 725/42 |
| 2008/0046919 A1* | 2/2008 | Carmi et al. | 725/32 |

* cited by examiner

*Primary Examiner* — Pankaj Kumar
*Assistant Examiner* — Mulugeta Mengesha
(74) *Attorney, Agent, or Firm* — Max S. Gratton

(57) ABSTRACT

Various embodiments of apparatus and/or methods are described for presenting advertisements in association with broadcast video content on a presentation device in a non-residential location. The advertisements are identified based on characteristics of the non-residential location, such as goods or services offered at the non-residential location. The advertisements may be presented simultaneously with the broadcast video content, or may be used as substitute content to replace interstitials within the broadcast video content.

19 Claims, 12 Drawing Sheets

METHODS AND APPARATUS FOR PRESENTING ADVERTISEMENTS BASED ON A LOCATION OF A PRESENTATION DEVICE

RELATED APPLICATIONS

This application claims the benefit of U.S. Provisional Application No. 61/017,866, entitled "Methods and Apparatus For Presenting Advertisements Based On A Location of A Presentation Device", filed on Dec. 31, 2007, which is hereby incorporated by reference in its entirety.

BACKGROUND

Broadcast television programming typically includes advertisements interspersed between the segments of the television show. The value of these advertisements is highly dependent on the amount of viewers that watch a television show. The amount of viewers watching the television show is typically determined using statistical sampling calculated by research firms, such as Nielsen Media Research. These statistical samples typically account for television viewing only within the home, and thus, don't account for television viewing in public locations, such as restaurants, bars, airports and stores. As a result, broadcasters lose out on revenue because the rates set for advertisements are lower than they should be because of the exclusion of these viewers in the rating tallies.

In other instances, it would be desirable for commercial locations, such as stores and offices, as well as other public places, to offer television programming for the viewing pleasure of their patrons. This would allow viewers to see television programming regardless of their location without being tied to their television at home. This would also benefit broadcasters and advertisers, because their content would be seen by a larger number of viewers. However, there are equipment and programming costs associated with offering television programming in commercial settings. Further, there is often no monetary benefit for the operator of these commercial locations to offer television programming, because they may not derive revenue from the television programming. Present television technology provides virtually no incentive for most commercial locations to offer television programming to their customers, and thus, the number of commercial locations offering television programming is less than desired.

BRIEF DESCRIPTION OF THE DRAWINGS

The same number represents the same element or same type of element in all drawings.

DETAILED DESCRIPTION

The various embodiments described herein generally provide apparatus, systems and methods which facilitate the reception, processing, and outputting of content from one or more sources for presentation to end-users. Broadcast content is presented in association with advertisements that are targeted based on a location of the presentation device. In short, the various embodiments described herein provide targeted advertisements based on a location of a presentation device.

In at least one embodiment, the content to be received, processed, outputted and/or communicated may come in any of various forms including, but not limited to, audio, video, data, information, or otherwise. As used herein, "content" refers to information communicated via a media (e.g., on a television screen or otherwise) without concern as to the design, placement or layout of the information on the media. It is to be appreciated, however, that "content" includes videos, video clips, photographs, sound recordings, text files, graphical images and the like.

In various embodiments described herein, advertisements are identified for presentation in association with video content based on a location of a presentation device. In at least one embodiment, the presentation device is positioned in a non-residential location (e.g., a store, medical office or health club). Thus, the advertisements presented in association with the video content are selected based on characteristics of the non-residential location, such as goods or services offered at the non-residential location. The advertisements may come in any form, such as static images, text data, audio content, video content and the like. In at least one embodiment, the advertisements are presented simultaneously with the video content (e.g., in a split screen or picture-in-picture (PIP) format). In some embodiments, the advertisements are utilized as substitute content to replace interstitials (e.g., other advertisements) within broadcast video content. Thus, the various embodiments described herein provide techniques for targeting advertisements presented in association with broadcast and other video content based on the business of a non-residential location.

Figure 1:
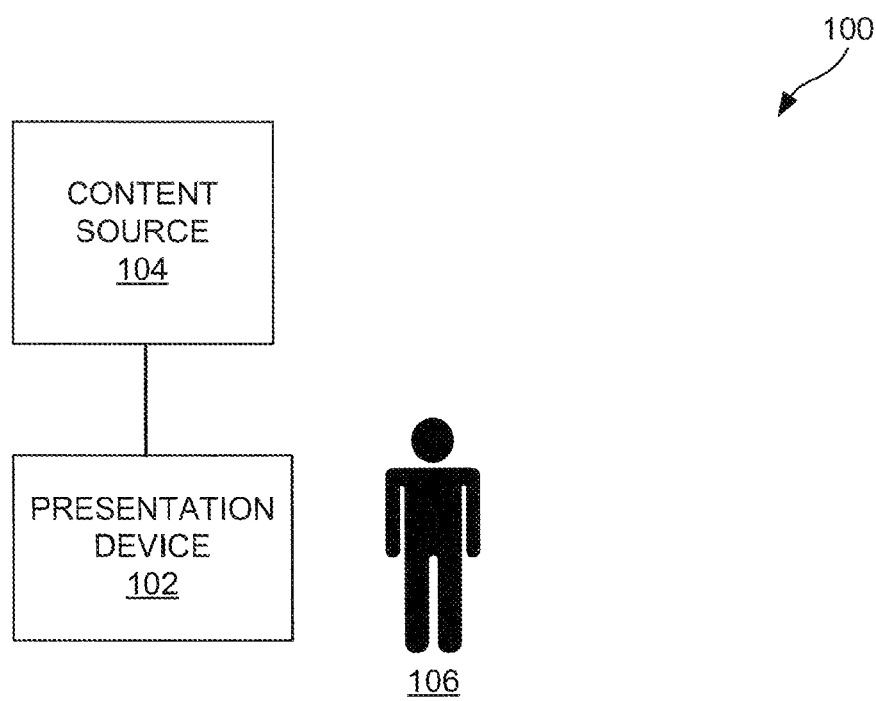
FIG. 1 illustrates an embodiment of an entertainment system.

FIG. 1 illustrates an embodiment of an entertainment system 100. The entertainment system 100 presents content to a user 106. In at least one embodiment, the content presented to the user 106 includes video content, such as a live television program, a movie, recorded content and the like. The entertainment system 100 includes a presentation device 102 and a content source 104. Each of these components is discussed in greater detail below.

The presentation device 102 is configured to receive content from one or more content source(s) 104, and to present the received content to the user 106. In at least one embodiment, the presentation device 102 is a display device configured to display content to the user 106. The presentation device 102 may receive a video stream in any format (e.g., analog or digital format), and present the video stream to the user 106. In at least one embodiment, the presentation device 102 receives broadcast video content from the content source 104, and presents the broadcast video content in a first region of a display area of the presentation device 102. The presentation device 102 also presents an advertisement in a second region of the display area of the presentation device 102. For example, if the aspect ratio of the presentation device 102 is 16:9, then the advertisement and the broadcast video content may be presented as a split screen of the presentation device. In some embodiments, the advertisements may be presented PIP with the broadcast video content.

The content source 104 may comprise any system or apparatus configured to provide presentation data, such as a video stream, to the presentation device 102. The content source 104 may be external or internal to the presentation device 102. The presentation device 102 and the content source 104 may be communicatively coupled through any type of wired or wireless connection, communication network and the like. Exemplary content sources include television distribution systems (e.g., over the air distribution systems, cable television distribution systems, satellite television distribution systems and broadband distribution systems), set-top boxes, DVD players and other optical disk players, digital storage mediums (e.g., DVRs) and the internet.

Figure 2:
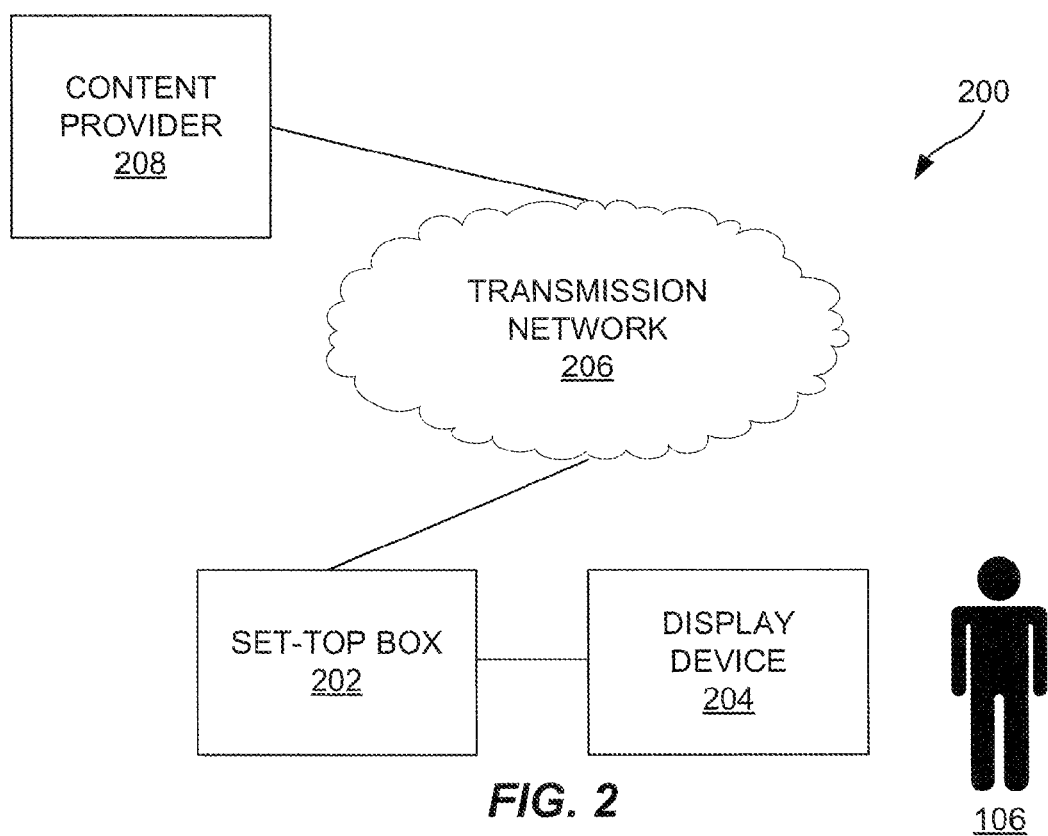
FIG. 2 illustrates an embodiment of a content distribution system.

FIG. 2 illustrates an embodiment of a content distribution system 200. The content distribution system 200 is configured to present a video stream, including targeted advertisements, to a user 106. The advertisements are targeted based on characteristics of the location of the display device 204. The content distribution system 200 includes a set-top box 202, a display device 204, a transmission network 206 and a content provider 208. Each of these components is discussed in greater detail below.

The display device 204 may comprise any type of device operable for receiving and displaying analog and/or digital video signals. In at least one embodiment, the display device 204 may be a television set or video display that contains an integrated television converter device (e.g., an internal cable-ready television tuner housed inside a television). The content distribution system 200 also includes a set-top box 202 that receives and demodulates analog and/or digital signals for presentation on the display device 204 that the display device 204 itself is unable to receive and demodulate.

Using an integrated television converter device, the display device 204 may be operable to communicate directly with the transmission network 206. For example, the transmission network 206 may comprise an over-the-air distribution system (e.g., free television), and the display device 204 may receive television broadcast signals using an internal or external antenna. The transmission network 206 may also comprise a cable television or satellite television distribution system, and the display device 204 may comprise a cable ready television adapted to receive and demodulate analog or digital cable television signals for presentation to the user 106. A direct broadcast satellite or other type of wired or wireless communications network may also be used solely or in conjunction with the foregoing. In at least one embodiment, the display device 204 may communicate with the transmission network 206 through the set-top box 202. The set-top box 202 is communicatively coupled to the display device 204 through any type of wired or wireless connection. Exemplary wired connections include coax, fiber, composite video and high-definition multimedia interface (HDMI). Exemplary wireless connections include WiFi and Bluetooth.

The set-top box 202 may include DVR functionality that captures and records video content from attached devices onto a storage medium for subsequent presentation to the user 106. As illustrated in FIG. 2, the set-top box 202 is coupled to a content provider 208 (e.g., a satellite television provider) through the transmission network 206. Thus, the set-top box 202 receives a television signal (e.g., a broadcast) or other data signal (e.g., digital video data or other data formatted into a video stream) from the transmission network 206, and outputs television programs and other content provided by the content provider 208 to the display device 204. The set-top box 202 may also record television programs and other content provided by the content provider for subsequent presentation. For example, the set-top box 202 may receive and record advertisements and other content from the transmission network 206, and utilize the recorded content for later insertion or presentation with other broadcast video content. It is to be appreciated that the set-top box 202 may capture and record video streams from other non-broadcast services, such as video recorders, DVD players, personal computers, the internet or other storage devices (e.g., universal serial bus (USB) flash drives).

The set-top box 202 may include a remote control or other input device (not shown) that the user 106 may utilize for remotely operating the set-top box 202 and/or the display device 204. More specifically, a remote control may be operable for controlling the presentation of video and/or other data presented by the set-top box 202 on the display device 204.

The content provider 208 comprises any source or sources of television or other video signals. In at least one embodiment, the content provider 208 provides a television broadcast signal to the set-top box 202 over the transmission network 206. The content provider 208 may also provide advertisements and other substitute content with the television broadcast signal. For example, the advertisements and/or substitute content may be provided in a different channel of the content provider 208 than the broadcast video content presented on the display device 204. The content provider 208 may be a television station that generates and provides the content or may be a television service that provides retransmission of television signals (e.g., a satellite television provider). It is to be appreciated that the content provider 208 may also provide some retransmission services while generating and providing some original or derivative content.

The transmission network 206 may comprise any type of communication network utilized between the set-top box 202 and the content provider 208. Exemplary communication networks include television distribution networks (e.g., over-the-air, satellite and cable television networks), wireless communication networks, public switched telephone networks (PSTN), and local area networks (LAN) or wide area networks (WAN) providing data communication services. The transmission network 206 may utilize any desired combination of wired (e.g., cable and fiber) and/or wireless (e.g., cellular, satellite, microwave, and radio frequency) communication mediums and any desired network topology (or topologies when multiple mediums are utilized). The set-top box 202 may communicate with the transmission network 206 through a wired or wireless connection. The transmission network 206 may distribute television broadcast and other data signals in digital or analog form. Exemplary video formats include moving pictures expert group (MPEG), flash, Windows Media, and the like. Content distribution system 200 may include other elements or components not illustrated for the sake of brevity.

Figure 3:
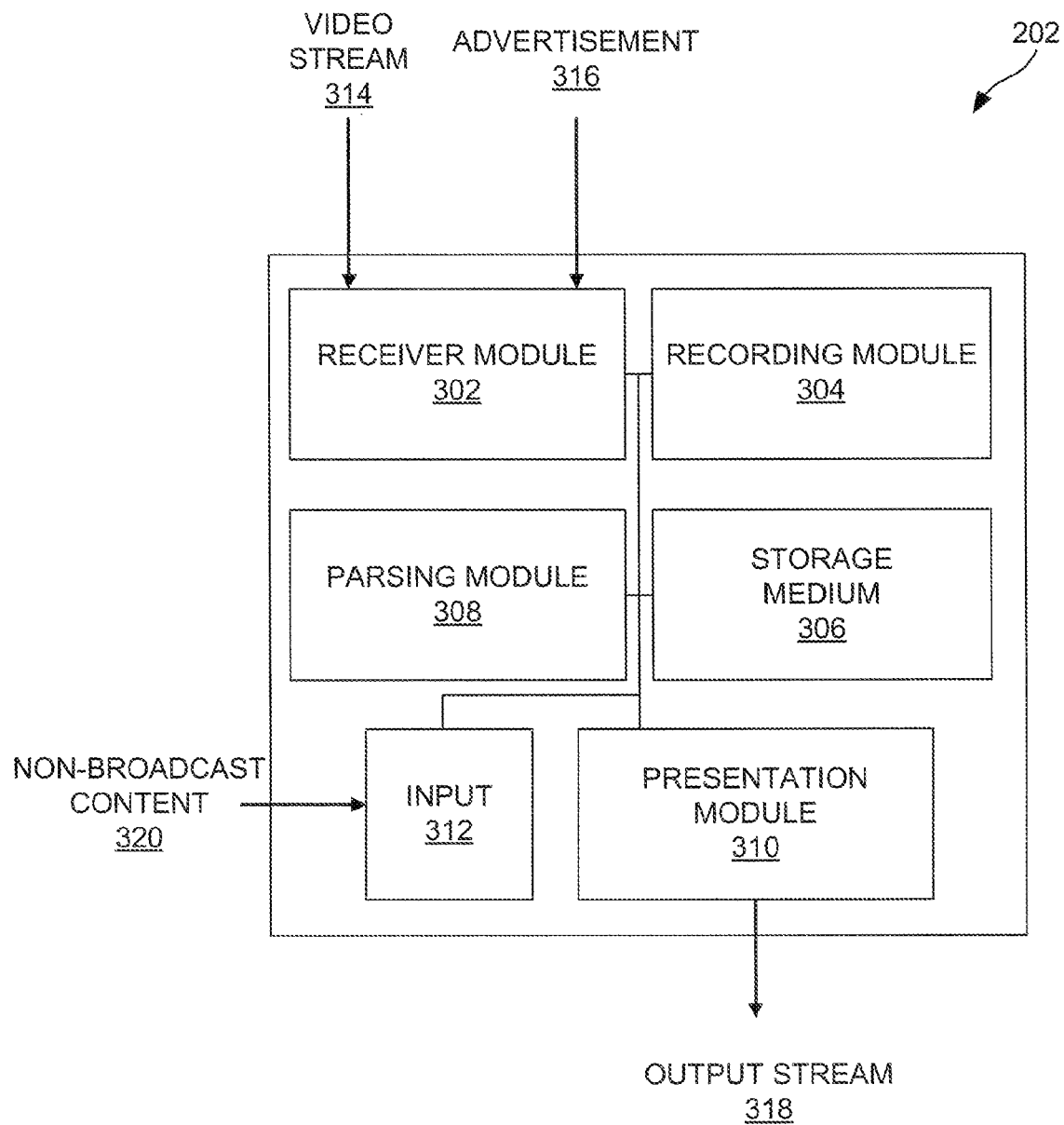
FIG. 3 illustrates an embodiment of functional components of the set-top box of FIG. 2.

FIG. 3 illustrates an embodiment of functional components of the set-top box 202 of FIG. 2. FIG. 3 will be discussed in reference to the content distribution system 200 illustrated in FIG. 2. The set-top box 202 comprises a receiver 302, a recording module 304, a storage medium 306, a parsing module 308, a presentation module 310 and an input 312. Each of these components is discussed in greater detail below.

The receiver 302 receives broadcast video content 314 from the transmission network 206 (see FIG. 2). The receiver 302 may comprise a wired or wireless receiver. The receiver 302 may further receive other data from the transmission network 206, such as an advertisement 316. The advertisement 316 may be provided as a broadcast, or may be pushed or pulled to a specific set-top box 202. In at least one embodiment, the receiver 302 includes at least two tuners, and the receiver 302 receives the broadcast video content 314 on a first channel, and receives the advertisement 316 on a second channel of the transmission network 206.

The recording module 304 receives the broadcast video content 314 and/or the advertisement 316, and stores the broadcast video content 314 and/or the advertisement 316 on the storage medium 306. In at least one embodiment, the recording module 304 may capture advertisements or other substitute content, that are subsequently presented in association with the broadcast video content 314. In at least one embodiment, the presentation of the advertisement 316 may be looped during presentation of the broadcast video content 314. Further, a single advertisement 316 may be looped and presented during presentation of different broadcast programs throughout the day. For example, the display device 204 may be positioned in a medical office, and may present a 24 hour news channel on the left side of the display area of the display device 204. The advertisement 316 may include information regarding a new allergy medication, and may be presented on the right side of the display area of the display device 204 throughout the entire day.

The storage medium 306 may be any type of temporary or persistent storage device capable of storing the broadcast video content 314 and the advertisement 316. The storage medium 306 may be internal and/or external to the set-top box 202. For example, the storage medium 306 may be an internal hard drive or flash memory. The broadcast video content 314 and the advertisement 316 may be stored together and/or separately on the storage medium 306. The storage medium 306 may additionally store non-broadcast content 320 that is presented in association with the broadcast video content 314 and the advertisement 316. The non-broadcast content 320 is provided to the set-top box 202 through an input 312.

In at least one embodiment, the input 312 may be adapted to receive a portable storage device, such as a USB flash drive, to transfer the non-broadcast content 320 to the storage medium 306. In some embodiments, the input 312 may communicatively couple to a data network to receive the non-broadcast content 320. In at least one embodiment, the non-broadcast content 320 may be provided by an operator of the non-residential location of the display device 204. Further, the non-broadcast content 320 may include information regarding goods and services offered at the non-residential location that is specific to that particular business. For example, the non-broadcast content 320 may include information indicating the hours for flu shots offered at the medical office that week.

The parsing module 308 is configured to parse the broadcast video content 314 to detect interstitials within the broadcast video content 314. A video stream (e.g., a television program) may be comprised of multiple segments of video frames, which are interspersed with interstitials (e.g., advertisements). As used herein, an interstitial is the video frames of a recording that do not belong to a selected show (e.g., advertisements, promotions, alerts, and other shows). A segment of video includes contiguous video frames of the program that are between one or more interstitials.

In at least one embodiment, the parsing module 308 detects the interstitials by parsing metadata associated with the broadcast video content 314. For example, markers may be placed in the broadcast video content 314 marking the beginning and endings points of the interstitial. In at least one embodiment, the interstitials may then be replaced with substitute content during presentation of the broadcast video content 314.

The presentation module 310 is configured to identify advertisements 316 for presentation in association with the broadcast video content 314 based on characteristics of the location of the display device 204. The presentation module 310 combines the video stream 314, the advertisement 316 and the non-broadcast content 320 into a single output stream 318 for presentation on the display device 204.

Those of ordinary skill in the art will appreciate that the various functional elements 302 through 312 shown as operable within the set-top box 202 may be combined into fewer discrete elements or may be broken up into a larger number of discrete functional elements as a matter of design choice. For example, the parsing module 308, the recording module 304 and/or the presentation module 310 may be combined into one or more processors or processing modules. Thus, the particular functional decomposition suggested by FIG. 3 is intended merely as exemplary of one possible functional decomposition of elements within the set-top box 202.

Figure 4:
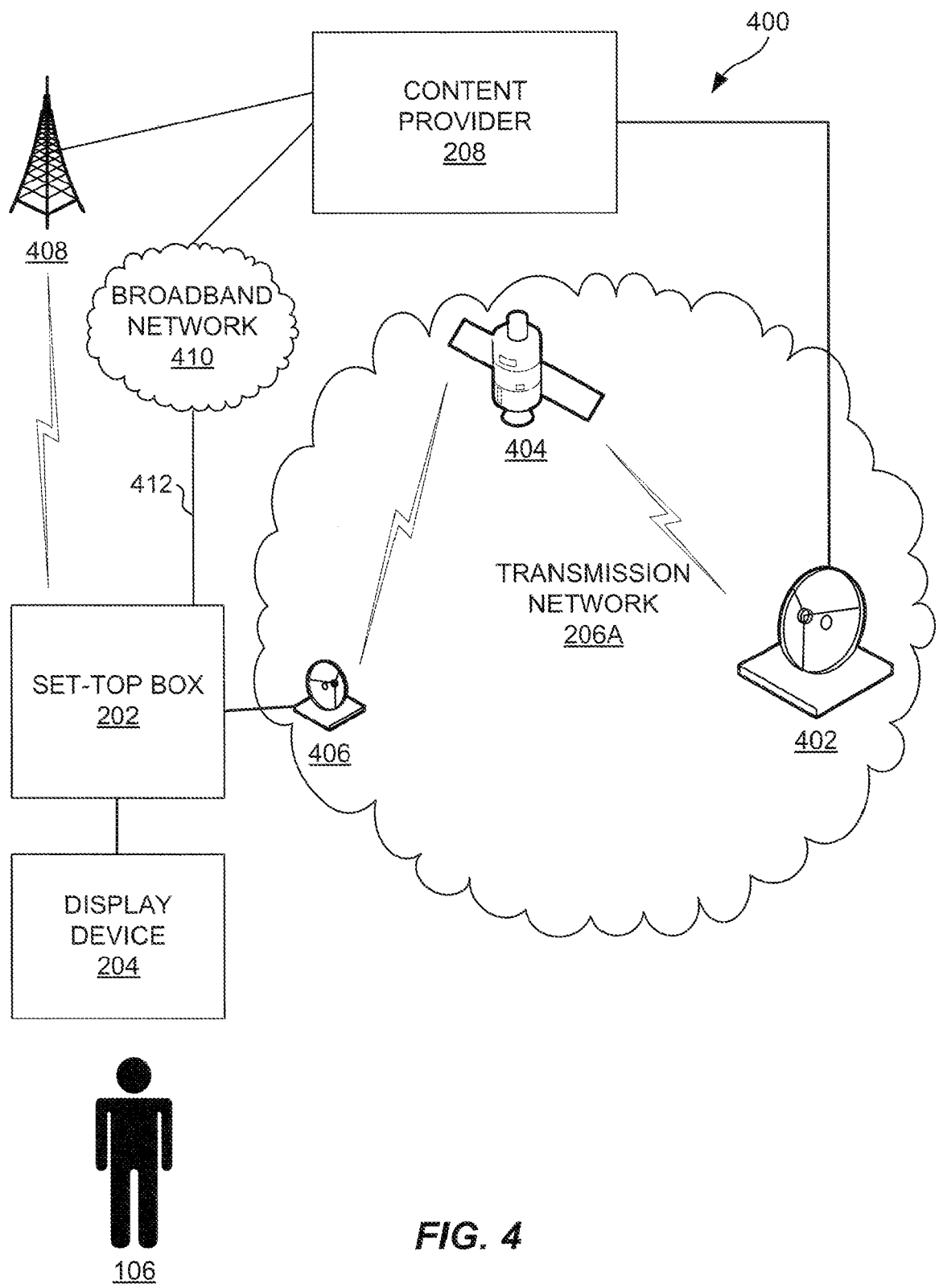
FIG. 4 illustrates an embodiment of a satellite broadcast system.

FIG. 4 illustrates an embodiment of a satellite broadcast system 400. More particularly, FIG. 4 illustrates details of a transmission network 206A. Satellite broadcast system 400 will be discussed in reference to content distribution system 200 illustrated FIGS. 2-3.

Satellite broadcast system 400 includes a content provider 208 in signal communication with an uplink system 402 of a transmission network 206A. The content provider 208 provides the uplink system 402 with television programs that are transmitted to a set-top box 202. Television programs may be broadcast by the transmission network 206A to the set-top box 202. The television program may be embodied as MPEG-2, MPEG-4 or other digital video signals, analog or baseband signals, and/or other video data of a channel of the satellite broadcast system 400.

Satellite broadcast system 400 further comprises a satellite 404 in signal communication with the uplink system 402. The satellite 404 broadcasts television programs received from the uplink system 402. The satellite broadcast system 400 further comprises a satellite antenna 406 for receiving a television broadcast program (e.g., broadcast video content) from the satellite 404. The satellite antenna 406 is in signal communication with the set-top box 202, and provides the set-top box 202 with the television broadcast program. The broadcast television program content is received by the set-top box 202 and presented on the display device 204. The transmission network 206A may also be configured to transmit advertisements, substitute content and other data to the set-top box 202.

In at least one embodiment, the set-top box 202 may be configured to receive over-the-air television programming from a transmitter 408 using a built in receiver/tuner. For example, the set-top box 202 may receive local programming over-the-air, and may receive national programming from the transmission network 206A. In at least one embodiment, the set-top box 202 may receive the advertisements and/or substitute content from the transmitter 408.

As illustrated in FIG. 4, the set-top box 202 may optionally be communicatively coupled to the content provider 208 through a broadband network 410 using a broadband connection 412. The broadband connection 412 may be utilized to deliver advertisements, substitute content, non-broadcast content and/or video programming to the set-top box 202. It is to be appreciated that any combination of the described communication paths may be utilized to transmit video programming and other data between the content provider 208 and the set-top box 202. For example, the set-top box 202 may receive video programming through the transmission network 206A, and may request advertisements and non-broadcast content associated with the video programming from the content provider 208 using the broadband network 410. It is also to be appreciated that the advertisements, non-broadcast content and the video programming may be provided by difference sources (e.g., two different content providers 208).

Figure 5:
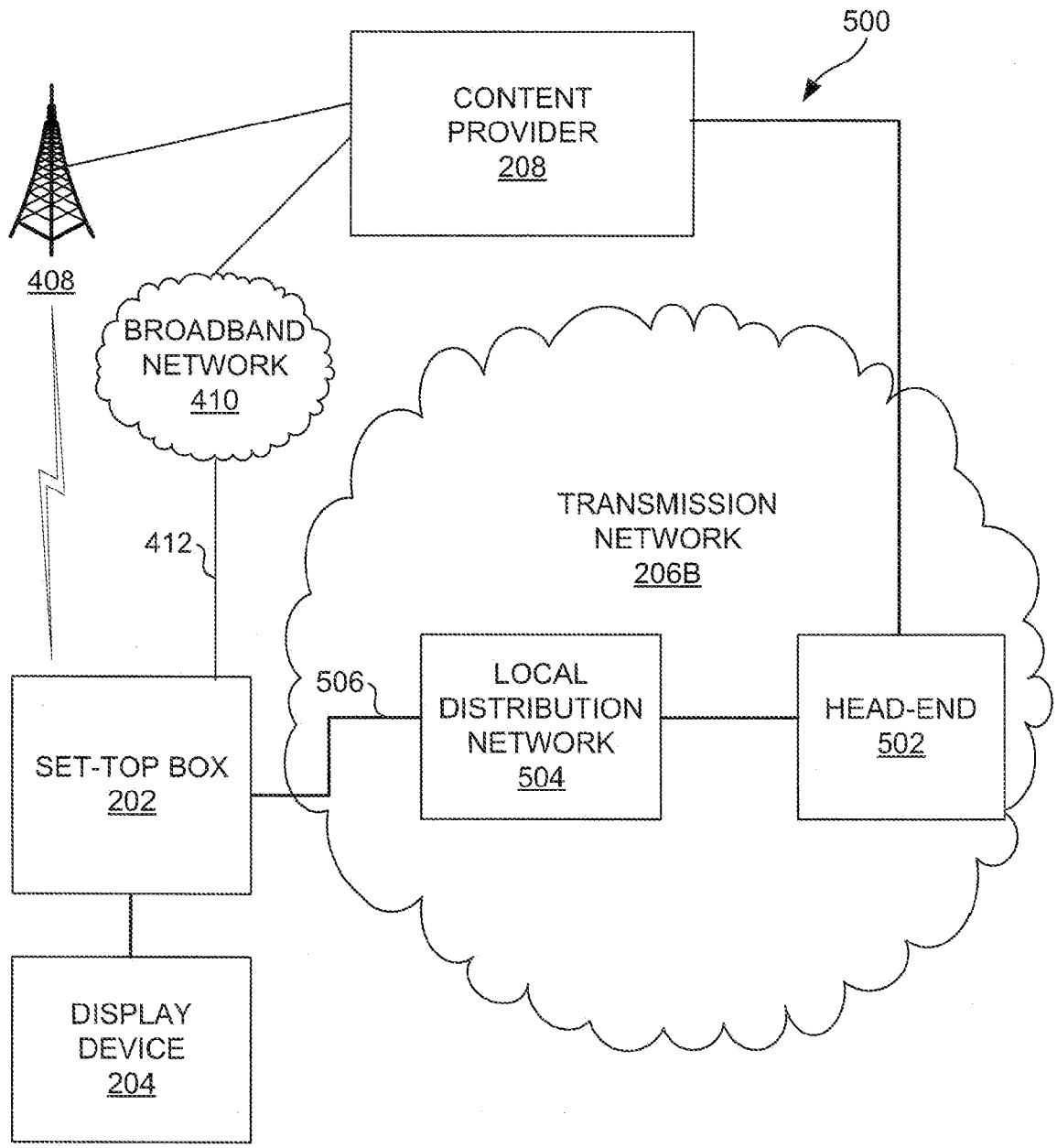
FIG. 5 illustrates an embodiment of a cable television distribution system.

Transmission network 206 (see FIG. 2) may also be embodied in a cable television distribution system. FIG. 5 illustrates an embodiment of a cable television distribution system 500. More particularly, FIG. 5 illustrates details of a transmission network 206B. Cable television distribution system 500 will be discussed in reference to content distribution system 200 illustrated in FIGS. 2-3.

Cable television distribution system 500 comprises a head-end 502 in signal communication with a content provider 208. The content provider 208 provides the head-end 502 with television programs that are transmitted to the display device 204. Television programs may be broadcast by the transmission network 206B, or may be pushed to the set-top box 202 responsive to a request by the user 106. Television programs may also be pushed to the set-top box 202 using a broadband connection 412 through the broadband network 410.

Cable television distribution system 500 further comprises a local distribution network 504 in signal communication with the head-end 502. The local distribution network 504 is operable for receiving content from the head-end 502 and distributing the content to individual display devices 204. The set-top box 202 is in signal communication with the local distribution network 504 using a drop 506 from a feeder line of the local distribution network 504. The local distribution network 504 may provide content as a broadcast to the set-top box 202, or may provide content to a specific addressable set-top box 202 using the broadband connection 412. In at least one embodiment, the broadband network 410 may be integrated within the transmission network 206B.

Figure 6:
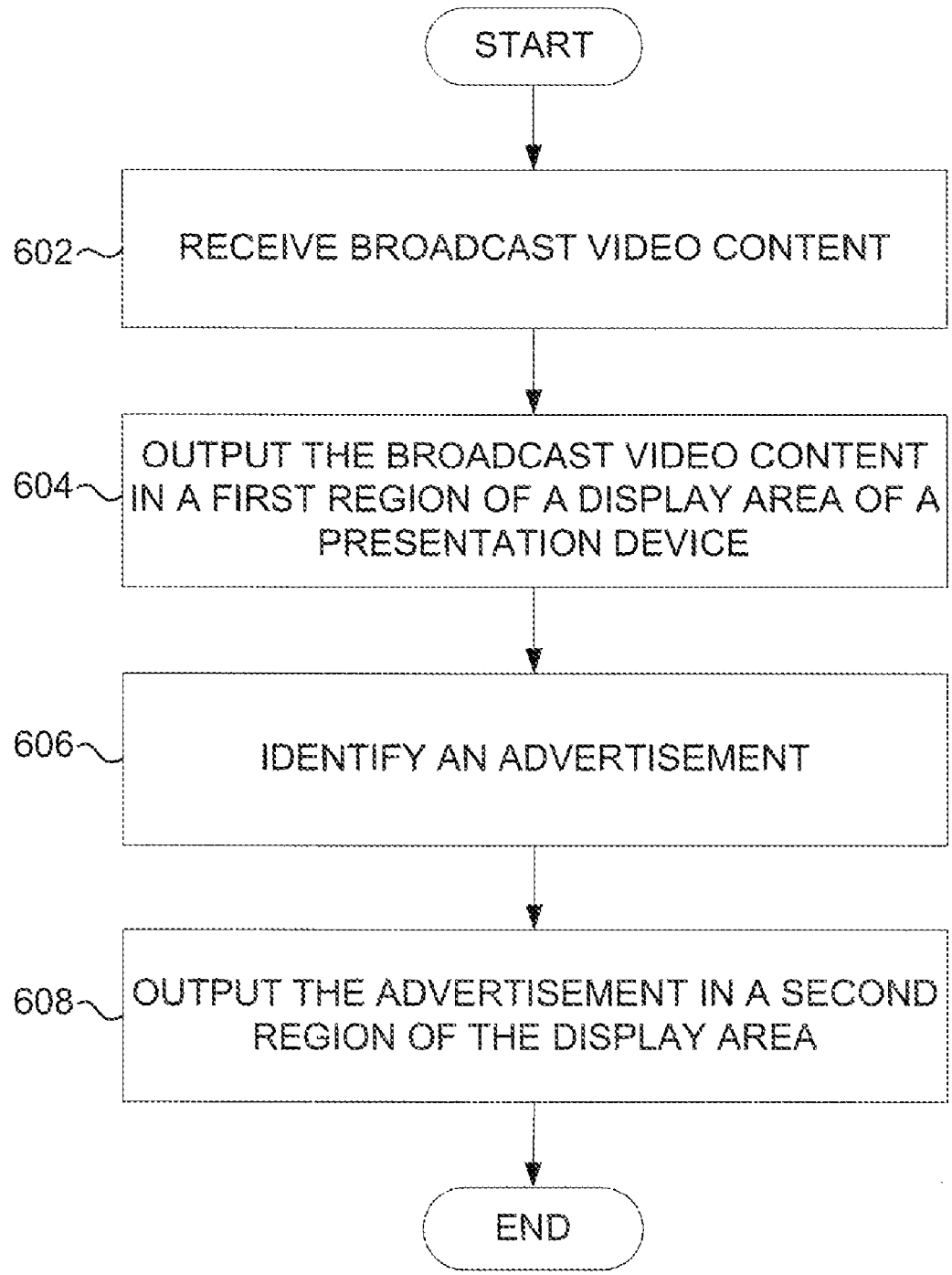
FIG. 6 illustrates an embodiment of a process for presenting video content.

FIG. 6 illustrates an embodiment of a process for presenting video content. More particularly, FIG. 6 illustrates a process for presenting targeted advertisements based on a location of a presentation device. The operations of the process of FIG. 6 are not all-inclusive, and may comprise other operations not illustrated for the sake of brevity.

The process includes receiving, in a non-residential location, broadcast video content from a programming source (operation 602). As used herein, a non-residential location refers to a commercial, governmental or organizational location that includes a presentation device positioned in a common viewing area within the property. The common viewing area may be open to members of the public. Non-residential locations may include public locations that are generally accessible to the public for transacting business. Examples of public locations include stores, restaurants, shopping malls, libraries, casinos and lounges. Non-residential locations may also include private locations that are accessible to the public on a more limited basis (e.g., office reception areas, waiting rooms or the private offices of professionals, such as doctors and attorneys). Non-residential locations may also include locations that are accessible to members only, such as health clubs.

The process further includes outputting the broadcast video content for presentation in a first region of a display area of a presentation device (operation 604). The presentation device is positioned within the common viewing area of the non-residential location. In at least one embodiment, the broadcast video content may be received by a set-top box and outputted to the presentation device in the form of a video signal. In other embodiments, the broadcast video content may be received by the presentation device, and may be outputted to the display area of the presentation device.

The process further includes identifying an advertisement for simultaneous presentation on the presentation device (operation 606). The advertisement is identified based on characteristics of the non-residential location of the presentation device. In at least one embodiment, the advertisement is identified based on goods or services offered at the non-residential location. For example, if the non-residential location is a car repair shop, then the identified advertisements may feature new cars or auto parts.

In at least one embodiment, the advertisement is one or more images which are periodically displayed in the second region of the display area. For example, the presentation device may loop through a series of ten images associated with the advertisement (i.e., a slide show), and each image may appear on screen for five seconds during each duration of the loop. In other embodiments, the advertisement may include video data that is presented in the second region of the display area. Because two different video streams may be presented at the same time, in at least one embodiment, the audio data may only be presented for one of the two video streams (e.g., the broadcast video data). Thus, text data, such as closed captioning data, associated with the advertisement, may be displayed within the second region to help viewers experience the audio portions of the advertisement.

The process further includes outputting the advertisement for presentation on the presentation device in a second region of the display area (operation 608). For example, the display area may be split in half, with the video broadcast content presented on the left side of the display area, and the advertisement presented on the right side of the display area. In some embodiments, the advertisement may be presented in a PIP of the broadcast video content.

In at least one embodiment, a set-top box may output to the presentation device a video signal that includes both the broadcast video content and the advertisement. The broadcast video content and the advertisement may also be outputted to the presentation device through multiple inputs of the presentation device, or through video signals outputted on multiple channels. For example, the presentation device may utilize multiple tuners to receive the advertisement and the broadcast video content, and may present the advertisement and the broadcast video content in a PIP configuration.

Figure 7:
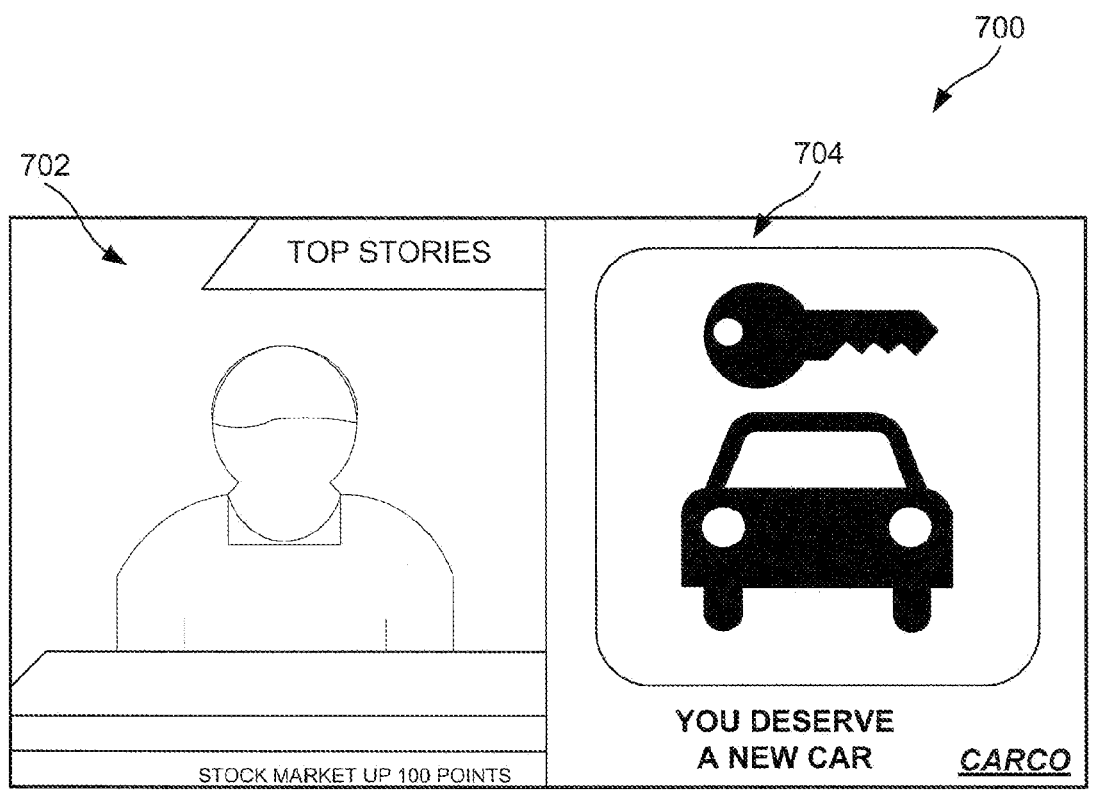
FIG. 7 illustrates an embodiment of a screenshot of a display area for a presentation device.

FIG. 7 illustrates an embodiment of a screenshot 700 of a display area for a presentation device. The screenshot 700 is presented in a split screen of the display area of the presentation device. The left region 702 of the presentation device presents broadcast video content. In the illustrated example, the broadcast video content is a news broadcast. The right region 704 of the display area is an advertisement for a new car. For example, the presentation device may be located in a car repair shop. Thus, the advertisement is selected based on the services offered by the car repair shop. If the presentation device was located in a day care center, then the advertisement might be for a new children's toy.

The advertisement presented in the right region may be identified based on many characteristics of the location of the presentation device. As described above, the goods and services offered at the business are one characteristic for identifying the advertisement. Thus, a presentation device in a car shop may present car related advertisements, while a beauty salon may present beauty supply advertisements. In at least one embodiment, the advertisement is selected on a national or regional level for all non-residential locations meeting selected criteria (e.g., all car shops may show a certain advertisement). Thus, in at least one embodiment, an advertisement may be broadcast to many different set-top boxes or presentation devices at the same time, with the devices determining whether the advertisement is relevant to the non-residential location of the presentation device. The broadcast of an advertisement may be provided simultaneously on a different channel than the broadcast video content. In other embodiments, advertisements may be transmitted as a broadcast or individual transmission to set-top boxes or presentation devices and stored for subsequent presentation.

However, the advertisement identification process may be further refined based on more local level data to ensure that the most relevant advertisements are shown in a particular non-residential location. For example, a shampoo advertisement for Brand X may be selected for presentation in all beauty salons in a region. However, one shop may not sell Brand X, but may sell Brand Y shampoo instead. Thus, an operator of the beauty salon may request that Brand Y advertisements be shown on the presentation device in their store instead of Brand X advertisements. In at least one embodiment, the operator of the non-residential location provides the advertisement to the set-top box or presentation device (e.g., uploaded using a USB flash drive)

In at least one embodiment, the advertisements may also be identified based on time data. For example, the beauty salon may have a high percentage of women during certain hours of the day that are likely interested in purchasing certain products. Thus, advertisements for those products may be presented during those hours of the day. However, during other hours of the day, the customer base may include more male customers, and thus, the advertisements selected for presentation during these times of the day may include products that males are more likely to purchase. In other words, advertisements may be selected to more accurately reflect the demographics of the customer base at a non-residential location at any particular time.

As described above, an advertisement may be part of a broadcast or may be selected on a regional or national basis. However, the display area of a presentation device may further present content that is local to the non-residential location, in a third region of the display area. For example, if a non-residential location is a restaurant, then the third region of the display area may present information regarding specials of the day at the restaurant.

Figure 8:
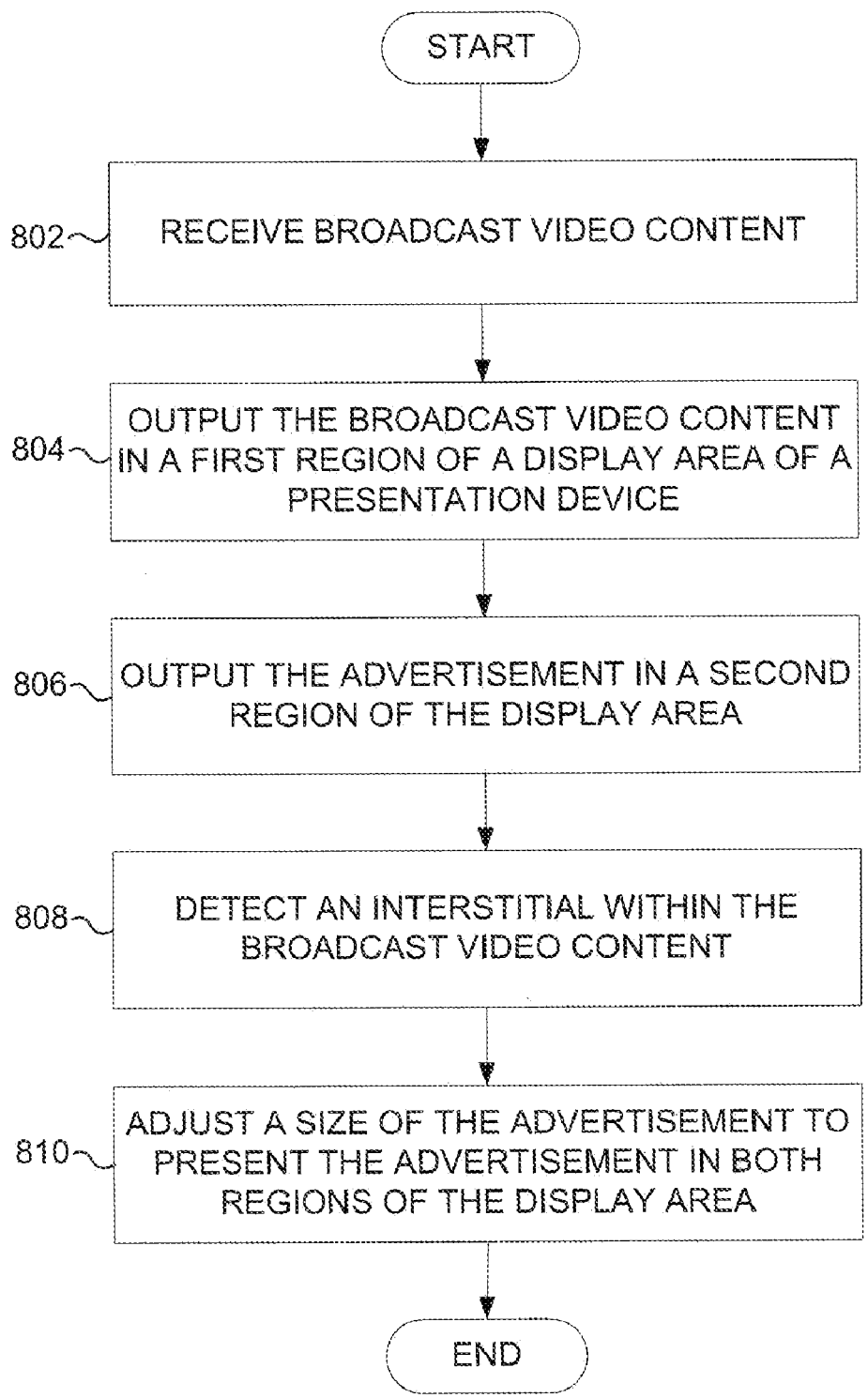
FIG. 8 illustrates an embodiment of a process for presenting different content in regions of a display area of a presentation device.

FIG. 8 illustrates an embodiment of a process for presenting different content in regions of a display area of a presentation device. More particularly, FIG. 8 illustrates a process for presenting an advertisement, broadcast video content and non-broadcast content (e.g., local content) in a split screen of the presentation device. The operations of the process of FIG. 8 are not all-inclusive, and may comprise other operations not illustrated for the sake of brevity.

The process includes outputting broadcast video content in a first region of the display area of the presentation device (operation 802). As described above, the broadcast video content may be received and presented on a presentation device in a non-residential location (e.g., a store). In at least one embodiment, the broadcast video content may be selected for presentation based on characteristics of the goods and/or services offered at the non-residential location. For example, if the non-residential location is a health club, then the broadcast video content may comprise an aerobics program airing on a channel of a satellite television provider.

The process further includes outputting an advertisement for presentation simultaneously on the presentation device with the broadcast video content (operation 804). As described above, the advertisement may be selected based on characteristics of the non-residential location of the presentation device. For example, if the non-residential location is a health club, then the advertisement may present information regarding a new smoothie available at a chain of health food stores in the area.

The process further includes identifying non-broadcast content provided by an operator of the non-residential location (operation 806). In at least one embodiment, the non-broadcast content comprises information regarding goods or services offered at the non-residential location. For example, the non-broadcast content may include information regarding upcoming aerobics classes offered at the health club. In at least one embodiment, the non-broadcast content is loaded onto a set-top box or presentation device using a portable storage device, such as a USB flash drive. In other embodiments, the set-top box or presentation device may be communicatively coupled to a data network, and the operator of the non-residential location may transmit the non-broadcast content to the set-top box or presentation device through the data network.

The non-broadcast content may be identified based on a variety of criteria, such as the time of day or characteristics of the broadcast video content. For example, if the broadcast video content is an aerobics program, then the non-broadcast content may include information regarding upcoming aerobics classes. Likewise, if the broadcast video content is a basketball game, then the non-broadcast video content may include information regarding upcoming pick-up basketball games offered at the health club. In at least one embodiment, the identification process may be determined based on information embedded in or associated with the broadcast video content stream. In some embodiments, the identification process may be determined based on information in an electronic program guide. For example, the set-top box may determine from the electronic program guide that the presentation device is presently displaying a basketball game, and thus, selects basketball related non-broadcast content for display.

The process further includes outputting the non-broadcast content for presentation on the presentation device in a third region of the display area (operation 810). In at least one embodiment, the non-broadcast content comprises scrolling text. For example, the non-broadcast content may be presented in a scrolling text bar at the bottom of the display area of the presentation device. In at least one embodiment, the non-broadcast content is outputted for presentation in closed captioning data presented on the display area of the presentation device. For example, in a restaurant, the closed captioning data presented on screen may identify the specials of the day or an order number ready for pick-up.

Figure 9:
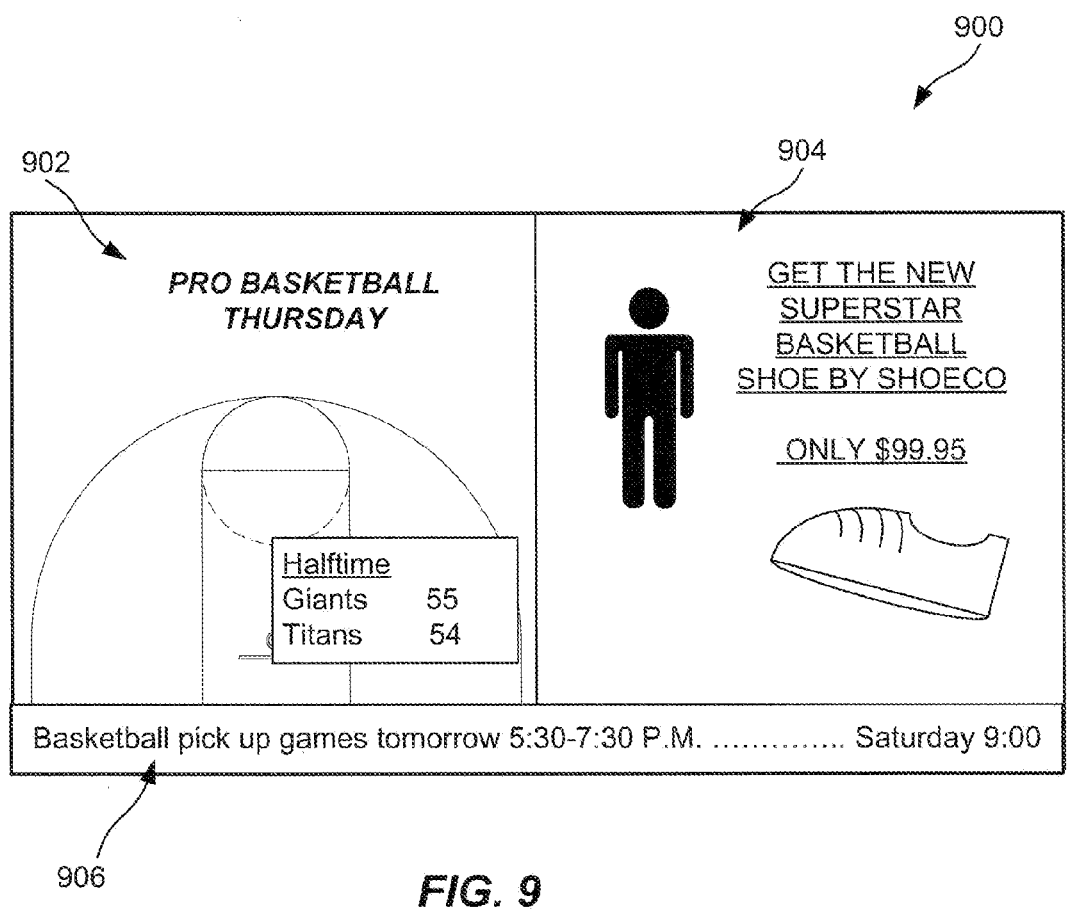
FIG. 9 illustrates an embodiment of a screenshot of a display area for a presentation device.

FIG. 9 illustrates an embodiment of a screenshot 900 of a display area for a presentation device. The screenshot 900 is split into three regions, 902, 904 and 906. The left region 902 of the presentation device presents broadcast video content of a basketball game. The right region 904 of the display area is an advertisement for a new basketball shoe. The advertisement has been selected to accompany the broadcast video content because of the related subject matter between the basketball game, the location of the presentation device (e.g., a health club) and the new basketball shoe. A viewer at a sports bar watching the same basketball game may see a different advertisement that is more relevant to the sports bar, but at the same time still relevant to basketball fans. The bottom region 906 features scrolling text that indicates the times for upcoming basketball pick-up games at the health club.

Figure 10:
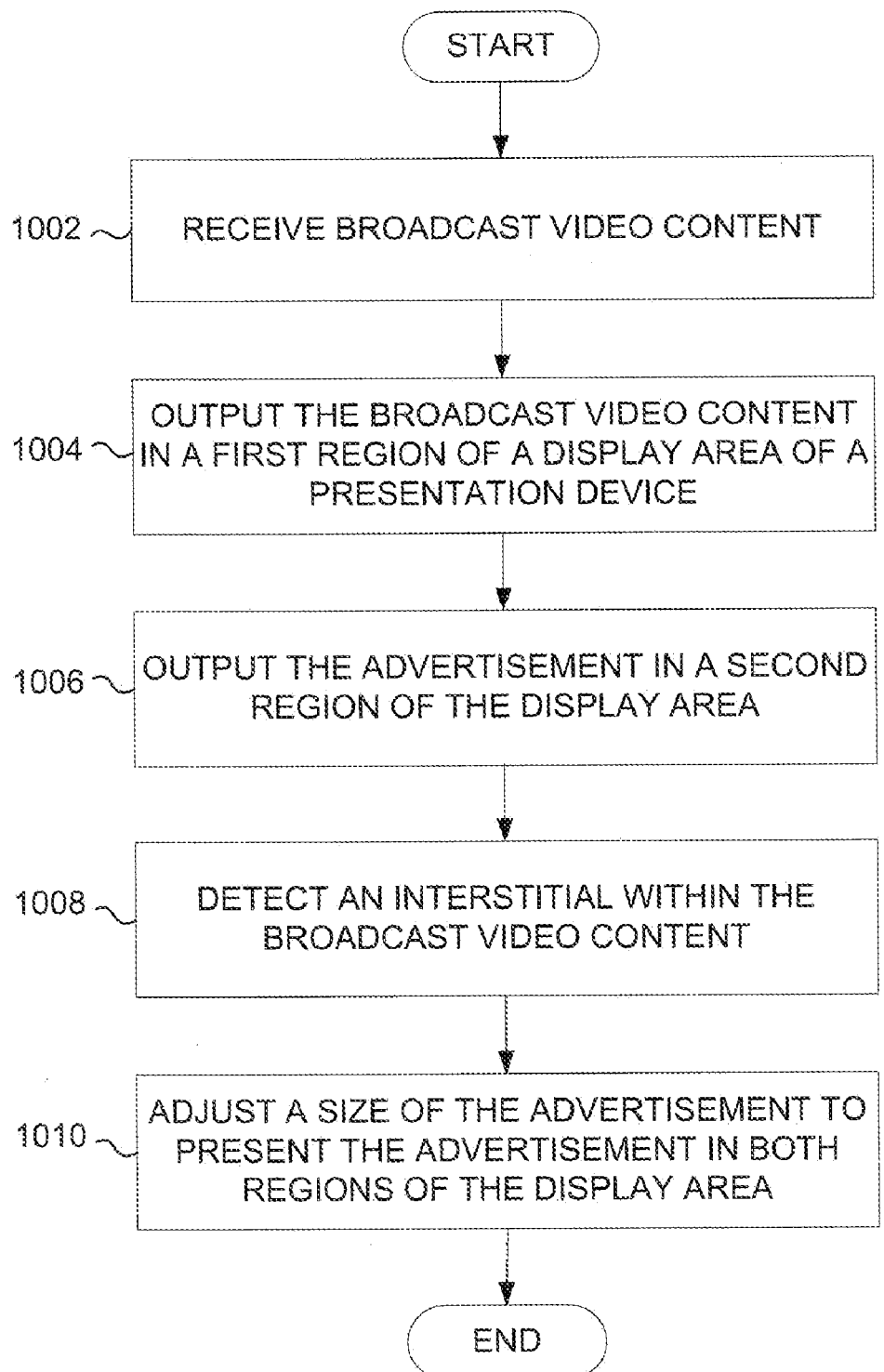
FIG. 10 illustrates another embodiment of a process for presenting video content.

FIG. 10 illustrates another embodiment of a process for presenting video content. More particularly, FIG. 10 illustrates a process for presenting an advertisement in a split screen of the presentation device in association with broadcast video content, and switching the advertisement to full screen mode during interstitials of the broadcast video content. The operations of the process of FIG. 10 are not all-inclusive, and may comprise other operations not illustrated for the sake of brevity.

The process includes receiving, in a non-residential location, broadcast video content from a programming source (operation 1002). The process further includes outputting the broadcast video content for presentation in a first region of a display area of a presentation device (operation 1004). As described above, the presentation device may occupy a non-residential location. The process further includes outputting an advertisement for presentation simultaneously on the presentation device with the broadcast video content (operation 1006). The advertisement is selected based on characteristics of the non-residential location of the presentation device as described in operation 606 of FIG. 6.

The process further includes detecting an interstitial within the broadcast video content (operation 1008). In at least one embodiment, markers may be placed within the broadcast video content to delineate segments of the show from interstitials (e.g., advertisements). In other embodiments, analysis of the audio and video content is performed (e.g., blackfield detection) to detect the beginning and ending points of the interstitials.

The process further includes adjusting a size of the advertisement, during at least a portion of the duration of the interstitial, to present the advertisement in both the first region and the second region of the display area (operation 1010). Thus, during the interstitial of the broadcast video content (e.g., a commercial break), a viewer sees the targeted advertisement in full screen mode, rather than the split screen mode that also displays a commercial in the broadcast video content. In at least one embodiment, the advertisement is a static image or a series of static images, which are presented in full screen mode during the interstitial.

In other embodiments, the advertisement may comprise a video that normally plays without sound, with closed captioning data presented in the display area to indicate the audio data of the advertisement. However, when the advertisement is presented in full screen mode, then the corresponding audio may be presented so that viewers are able to fully experience the content of the advertisement. In at least one embodiment, switching to the full screen mode of the advertisement region of the display area may also include presenting a different advertisement in the advertisement region than the advertisement presented at the beginning of the interstitial. If the advertisement presented during the segments of the program does not include audio data, then a different advertisement may be utilized that includes audio data to take full advantage of the commercial break in the television program.

Figure 11:
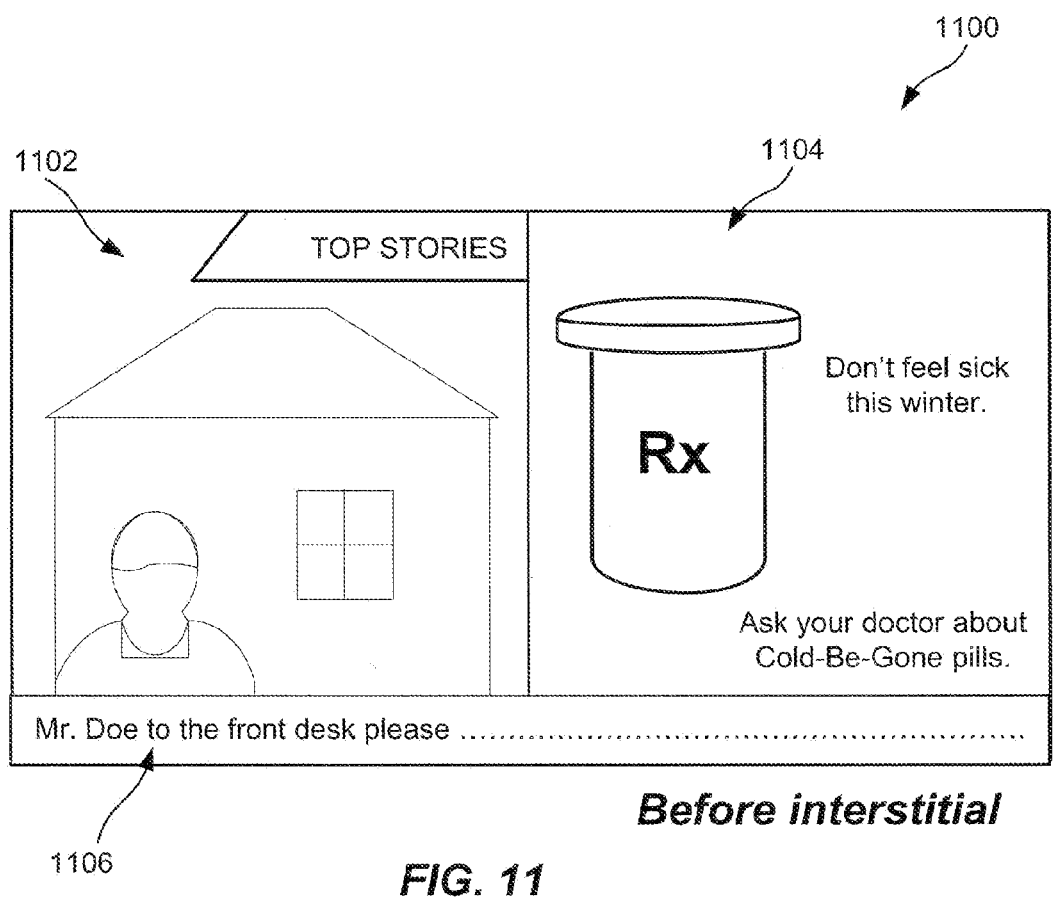
FIG. 11 illustrates an embodiment of a screenshot of a display area for a presentation device before an interstitial in broadcast video content.

FIG. 11 illustrates an embodiment of a screenshot 1100 of a display area for a presentation device. In the illustrated embodiment, the presentation device presenting the screenshot is located in a medical office. The screenshot 1100 is split into three regions, 1102, 1104 and 1106. The left region 1102 of the presentation device presents broadcast video content of a news program. The right region 1104 of the display area contains an advertisement for a new cold medication. The bottom region 1106 displays a scrolling text bar that includes information regarding which patient is next to see the doctor. The non-broadcast information presented in the bottom region 1106 may be provided by a computer at the front desk of the medical office that is communicatively coupled to a set-top box or the presentation device.

Figure 12:
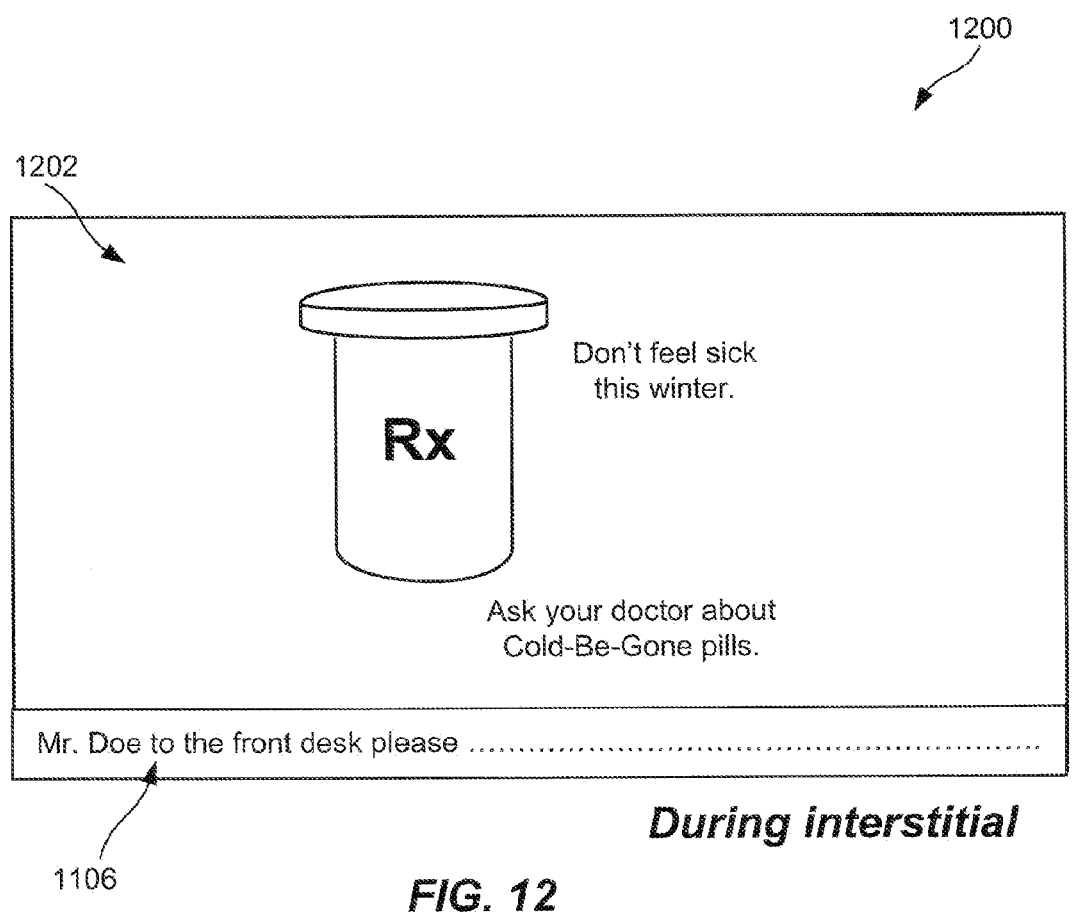
FIG. 12 illustrates an embodiment of a screenshot of a display area during an interstitial in the broadcast video content.

The screenshot 1100 illustrates the display area of the presentation device prior to presentation of an interstitial within the broadcast video content. After the interstitial is detected, the size of the advertisement presented in the right region 1104 is adjusted to cover both the left region 1102 and the right region 1104 of the display area. FIG. 12 illustrates a screenshot 1200 of the display area during the interstitial in the broadcast video content. The advertisement is displayed in a substantially full screen region 1202 of the display area. The scrolling text bar is left in place in the bottom region 1106. However, in at least one embodiment, the advertisement may be presented in a full screen mode that also covers the bottom region 1106, such that the scrolling text bar is omitted from presentation during the duration of the interstitial.

In at least one embodiment, the broadcast video content may be provided on a first channel of the programming source, and the advertisement may be provided on a second channel of the programming source. Thus, the adjustment operation may include eliminating a PIP and tuning the set-top box or presentation device to the second channel. The set-top box or presentation device may then monitor the first channel to determine when the interstitial in the broadcast video content is complete, and return the presentation device to the split screen or PIP mode once the interstitial is complete. The first channel and the second channel may be synchronized such that an advertisement begins playing on the second channel at the beginning of the interstitial of the first channel. In at least one embodiment, the programming source may offer an advertisement channel for each type of targeted advertisement that the programming source desires to provide. For example, there may be a medical advertisement channel that provides medical themed advertisements and a car advertisement channel that provides car themed advertisements. In some embodiments, targeted advertisements that are to be presented in full screen mode during interstitials within the broadcast video content may be stored on the set-top box or presentation device, and activated upon detection of the interstitial in the broadcast video content.

As described above, broadcasters are often unable to fully monetize the viewership in public places, such as health clubs or airports, because it is difficult to capture accurate numbers regarding viewers in these localities. However, embodiments described below allow broadcasters to provide multiple types of advertisements in the same advertisement slot for a program. The advertisement presented on each presentation device may vary based on where a presentation device is located. Thus, broadcasters may not only more fully monetize their advertisement slots, but they are also able to provide advertisers with more targeted advertisements based on the location, and hence, characteristics of the viewers.

Figure 13:
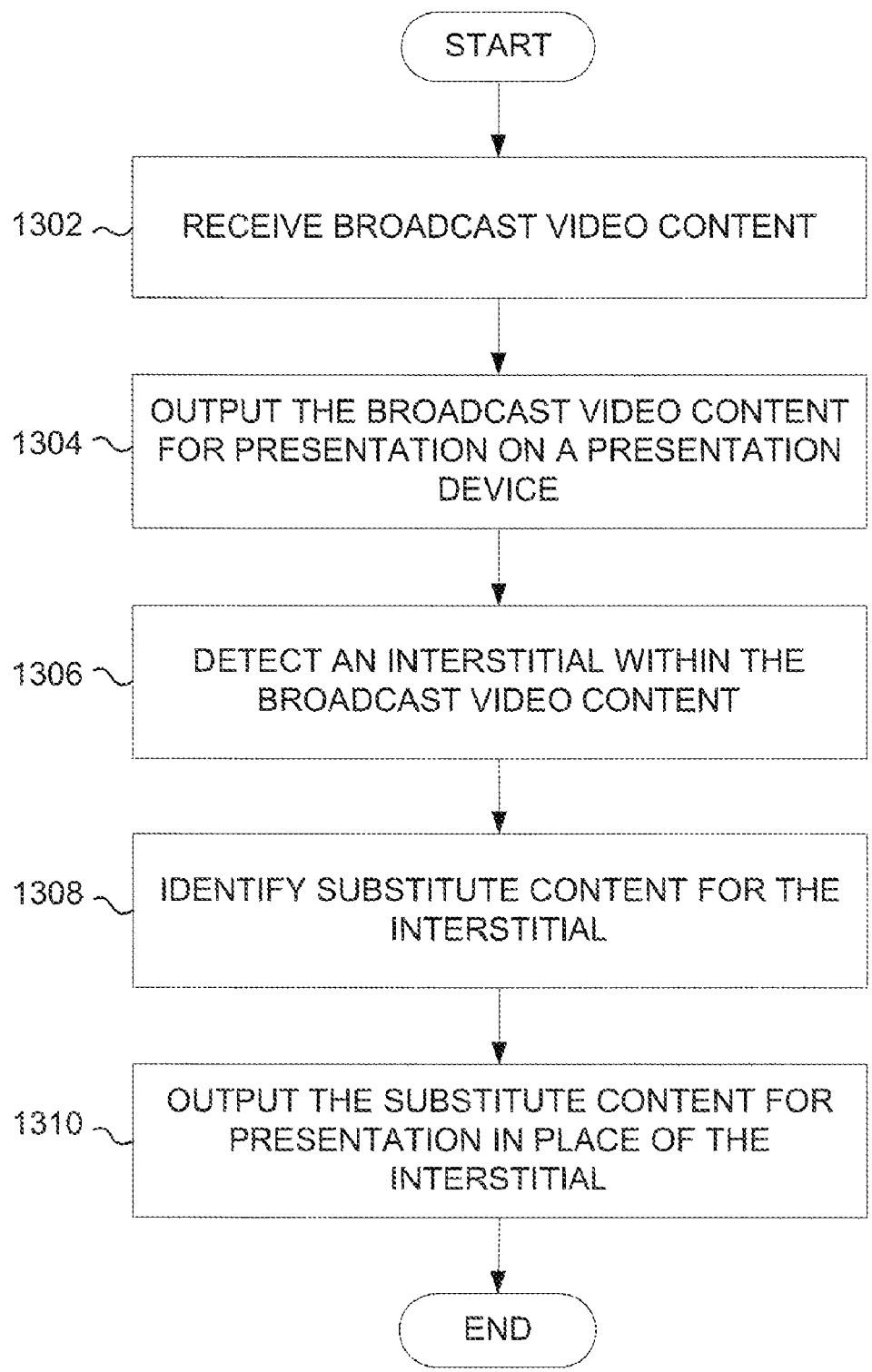
FIG. 13 illustrates another embodiment of a process for presenting substitute content during broadcast video content.

FIG. 13 illustrates another embodiment of a process for presenting substitute content during broadcast video content. More particularly, FIG. 13 illustrates a process for presenting different advertisements in the same advertisement slot of a program. The operations of the process of FIG. 13 are not all-inclusive, and may comprise other operations not illustrated for the sake of brevity.

The process includes receiving, in a non-residential location, broadcast video content from a programming source (operation 1302). The receiving operation may be as described above in operation 602 of FIG. 6. The process further includes outputting the broadcast video content for presentation on a presentation device (operation 1304). The broadcast video content may be presented in a standard full screen mode, or may be presented in combination with advertisements and/or non-broadcast content as described above in split screen or PIP modes The process further includes detecting an interstitial within the broadcast video content (operation 1306). The detection process may be described above in operation 1008 of FIG. 10. In at least one embodiment, the interstitial may include an advertisement that is normally broadcast during a television program (e.g., a public advertisement). As used herein, a public advertisement refers to content provided during a standard television broadcast. For example, the interstitial may include an advertisement for a brand of soda pop that has national appeal.

The process further includes identifying substitute content for the interstitial (operation 1308), and outputting the substitute content for presentation on the presentation device in place of the interstitial (operation 1310). The substitute content may be identified based on characteristics of the non-residential location of the presentation device. For example, if the non-residential location is a health club, then the substitute content may include an advertisement for a health drink that replaces the advertisement for the soda pop. In at least one embodiment, the identification process is performed based on customers of the non-residential location of the presentation device. For example, advertisements may be selected based on demographics of customers that frequent the non-residential location, to target advertisements that will appeal to the broadest base of customers of the non-residential location.

The original advertisement in the interstitial and the substitute content may be provided by the same advertiser or different advertisers. For example, a beverage company may want to use the advertisement time slot to advertise their soda pop product in residences, but use the same advertisement slot to target exercisers in the health club with a healthier beverage product. Likewise, an advertiser may want their advertisement only shown in health clubs, and thus, may provide a more targeted advertisement to a smaller audience at a lower price than purchasing a full broadcast advertisement for a television program. Thus, the advertisement may replace a broadcast advertisement in the television program during presentation in health clubs. The advertisement substitution may be provided by a broadcaster, service provider (e.g., a satellite television provider) or an operator of the non-residential location (e.g., an owner of a health club)

In at least one embodiment, the substitute content is provided on a different channel of the programming source than the broadcast video content. In some embodiments, substitute content may be stored on a set-top box or presentation device, and activated for presentation at the appropriate time. For example, the broadcast video content may include metadata that indicates which substitute content is to be shown at which type of non-residential location.

In at least one embodiment, the substitute content is provided by an operator of the non-residential location. For example, a health club business having hundreds of locations may undertake selling targeted advertisements for certain broadcast programming, and split the profits for the advertisements with the broadcaster. In other embodiments, the substitute content may be broadcast in association with the broadcast video content. Thus, a set-top box or presentation device may filter the broadcast stream to present the appropriate advertisements for the non-residential location of the presentation device.

Although specific embodiments were described herein, the scope of the invention is not limited to those specific embodiments. The scope of the invention is defined by the following claims and any equivalents therein.

What is claimed is:

1. A method for presenting video content, the method comprising:
   receiving, in a non-residential location, broadcast video content from a programming source on a first broadcast channel;
   outputting the broadcast video content for presentation in a first region of a display area of a presentation device;
   receiving an advertisement from the programming source on a second broadcast channel, for simultaneous presentation on the presentation device with the broadcast video content, the second channel selected based on characteristics of the non-residential location of the presentation device;
   outputting the advertisement for presentation on the presentation device in a second region of the display area;
   receiving non-broadcast content provided by an operator of the non-residential location, the non-broadcast content including information regarding at least one of goods and services offered at the non-residential location; and
   outputting the non-broadcast content for presentation on the presentation device in a third region of the display area;
   wherein receiving the non-broadcast content comprises receiving the non-broadcast content from an external computing device located at the non-residential location.

2. The method of claim 1, wherein the second broadcast channel is selected based on at least one of goods or services offered at the non-residential location.

3. The method of claim 1, wherein the non-broadcast content comprises scrolling text.

4. The method of claim 3, wherein outputting the non-broadcast content further comprises outputting the non-broadcast content in closed captioning data presented on the display screen.

5. The method of claim 1, wherein receiving the non-broadcast content from the external computing device comprises receiving the non-broadcast content from the external computing device simultaneously with the broadcast video content.

6. A method for presenting video content, the method comprising:
   receiving, in a non-residential location, broadcast video content from a programming source on a first broadcast channel;
   outputting the broadcast video content for presentation in a first region of a display area of a presentation device;
   receiving an advertisement from the programming source on a second broadcast channel, the second broadcast channel selected based on characteristics of the non-residential location of the presentation device;
   outputting the advertisement for presentation simultaneously on the presentation device with the broadcast video content in a second region of the display area;
   receiving non-broadcast content provided by an operator of the non-residential location, the non-broadcast content including information regarding at least one of goods and services offered at the non-residential location;

outputting the non-broadcast content for presentation on the presentation device in a third region of the display area;

detecting an interstitial within the broadcast video content; and adjusting a size of the advertisement, to present the advertisement in both the first region and the second region of the display area, during at least a portion of the duration of the interstitial;

wherein receiving the non-broadcast content comprises receiving the non-broadcast content from an external computing device located at the non-residential location.

7. The method of claim 6, wherein the second broadcast channel is selected based on at least one of goods or services offered at the non-residential location.

8. The method of claim 6, wherein the advertisement comprises information regarding goods or services offered at the non-residential location.

9. The method of claim 6, wherein receiving the non-broadcast content from the external computing device comprises receiving the non-broadcast content from the external computing device simultaneously with the broadcast video content.

10. A method for presenting video content, the method comprising:

receiving, in a non-residential location, broadcast video content from a programming source on a first broadcast channel;

outputting the broadcast video content for presentation on a presentation device in a first region of a display area;

detecting an interstitial within the broadcast video content;

receiving substitute content for the interstitial from the programming source responsive to detecting the interstitial, the substitute content broadcasted on a second broadcast channel, wherein the second broadcast channel is selected based on characteristics of the non-residential location of the presentation device;

outputting the substitute content, for presentation on the presentation device, in place of the interstitial, in the first region of the display area;

receiving non-broadcast content provided by an operator of the non-residential location, the non-broadcast content including information regarding at least one of goods and services offered at the non-residential location; and outputting the non-broadcast content for presentation on the presentation device in a second region of the display area;

wherein receiving the non-broadcast content comprises receiving the non-broadcast content from an external computing device located at the non-residential location.

11. The method of claim 10, wherein receiving the substitute content further comprises selecting the second broadcast channel based on customers of the non-residential location.

12. A television receiver comprising:

a receiver module that receives broadcast video content from a programming source on a first broadcast channel and that receives an advertisement on a second broadcast channel;

a processor communicatively coupled to the receiver module that outputs the broadcast video content for presentation in a first region of a display area of a presentation device and that outputs the advertisement on a second region of the display area; and a storage medium communicatively coupled to the processor that stores non-broadcast content provided by an operator of the non-residential location, the non-broadcast content including information regarding at least one of goods and services offered at the non-residential;

wherein the processor outputs the non-broadcast content for presentation on the presentation device in a third region of the display area;

wherein the processor:

detects an interstitial within the broadcast video content; and adjusts a size of the advertisement, to present the advertisement in both the first region and the second region of the display area, during at least a portion of the duration of the interstitial; wherein receiving the non-broadcast content comprises receiving the non-broadcast content from an external computing device located at the non-residential location.

13. The television receiver of claim 12, wherein the second broadcast channel is selected for presentation based on at least one of goods or services offered at the non-residential location.

14. The television receiver of claim 12, wherein the advertisement comprises video content, and the non-broadcast content comprises scrolling text.

15. The television receiver of claim 14, wherein the processor outputs the non-broadcast content in closed captioning data presented on the display screen.

16. A television receiver comprising:

a receiver module that receives broadcast video content from a programming source on a first broadcast channel and that receives substitute content on a second broadcast channel;

a processor communicatively coupled to the receiver module that:

outputs the broadcast video content for presentation on a presentation device in a first region of a display area;

detects an interstitial within the broadcast video content;

instructs the receiver module to receive the substitute content on the second broadcast channel responsive to detecting the interstitial, the second broadcast channel selected based on at least one of goods or services offered at the non-residential location of the presentation device; and outputs the substitute content to the presentation device in place of the interstitial;

wherein the processor outputs non-broadcast content in a second region of the display area, the television receiver operating to receive the non-broadcast content from an operator of the non-residential location, the non-broadcast content including information regarding at least one of goods and services offered at the non-residential location;

wherein the television receiver receives the non-broadcast content from an external computing device located at the non-residential location.

17. The television receiver of claim 16, wherein the processor outputs the non-broadcast content in closed captioning data presented on the display screen.

18. The television receiver of claim 16, wherein identifying the substitute content further comprises receiving the substitute content from an operator of the non-residential location.

19. The television receiver of claim 16, further comprising:

a storage medium communicatively coupled to the processor that stores the non-broadcast content provided by the operator of the non-residential location.

\* \* \* \* \*